(12) United States Patent
Miura et al.

(10) Patent No.: US 12,499,926 B2
(45) Date of Patent: Dec. 16, 2025

(54) SEMICONDUCTOR DEVICE CAPABLE OF SWITCHING OPERATION VOLTAGE

(71) Applicant: MICRON TECHNOLOGY, INC., Boise, ID (US)

(72) Inventors: Yuki Miura, Kanagawa (JP); Moeha Shibuya, Kanagawa (JP); Saaya Izumi, Kanagawa (JP)

(73) Assignee: Micron Technology, Inc., Boise, ID (US)

( * ) Notice: Subject to any disclaimer, the term of this patent is extended or adjusted under 35 U.S.C. 154(b) by 188 days.

(21) Appl. No.: 18/460,992

(22) Filed: Sep. 5, 2023

(65) Prior Publication Data

US 2024/0170040 A1 May 23, 2024

Related U.S. Application Data

(60) Provisional application No. 63/384,386, filed on Nov. 18, 2022.

(51) Int. Cl.
*G11C 5/14* (2006.01)
*G11C 11/4063* (2006.01)
*H01L 23/528* (2006.01)

(52) U.S. Cl.
CPC ...... *G11C 11/4063* (2013.01); *H01L 23/5283* (2013.01); *H01L 23/5286* (2013.01)

(58) Field of Classification Search
CPC ............. G11C 11/4063; H01L 23/5283; H01L 23/5286
See application file for complete search history.

(56) References Cited

U.S. PATENT DOCUMENTS

| | | | |
|---|---|---|---|
| 2012/0206989 A1* | 8/2012 | Song | G11C 8/08 323/311 |
| 2021/0175171 A1* | 6/2021 | Jung | H01L 23/5286 |
| 2022/0084583 A1* | 3/2022 | Sugahara | H03K 3/356 |
| 2022/0383957 A1* | 12/2022 | Kajita | G11C 16/30 |

* cited by examiner

*Primary Examiner* — Min Huang
(74) *Attorney, Agent, or Firm* — Dorsey & Whitney LLP

(57) ABSTRACT

An apparatus that includes first, second, third and fourth circuit regions arranged in a first direction in numerical order. The first circuit region includes a first global power supply line extending in a second direction vertical to the first direction and a first local power supply line, the first local power supply line being branched from the first global power supply line and extending in the first direction across the second, third and fourth regions. The third circuit region includes a first power switch coupled between the first local power supply line and an internal power supply line extending in the first direction across the first, second, third and fourth regions. Each of the second and fourth regions includes a circuit coupled to the first local power supply line and an additional circuit coupled to the internal power supply line.

23 Claims, 10 Drawing Sheets

SEMICONDUCTOR DEVICE CAPABLE OF SWITCHING OPERATION VOLTAGE

CROSS REFERENCE TO RELATED APPLICATION(S)

This application claims priority to U.S. Provisional Application No. 63/384,386, filed Nov. 18, 2022. The aforementioned application is incorporated herein by reference, in its entirety, for any purpose.

BACKGROUND

A semiconductor device such as a DRAM may be configured to be able to switch an operation voltage of a part of its internal circuits in accordance with a required operating speed. Such a semiconductor device includes a switching circuit for switching the operation voltage. When an operation voltage for high-speed operation is selected, it is desirable that a wiring resistance from the switching circuit to the internal circuit is as low as possible.

DETAILED DESCRIPTION

Various embodiments of the present disclosure will be explained below in detail with reference to the accompanying drawings. The following detailed description refers to the accompanying drawings that show, by way of illustration, specific aspects, and various embodiments of the present disclosure. The detailed description provides sufficient detail to enable those skilled in the art to practice these embodiments of the present disclosure. Other embodiments may be utilized, and structural, logical, and electrical changes may be made without departing from the scope of the present disclosure. The various embodiments disclosed herein are not necessary mutually exclusive, as some disclosed embodiments can be combined with one or more other disclosed embodiments to form new embodiments.

Figure 1:
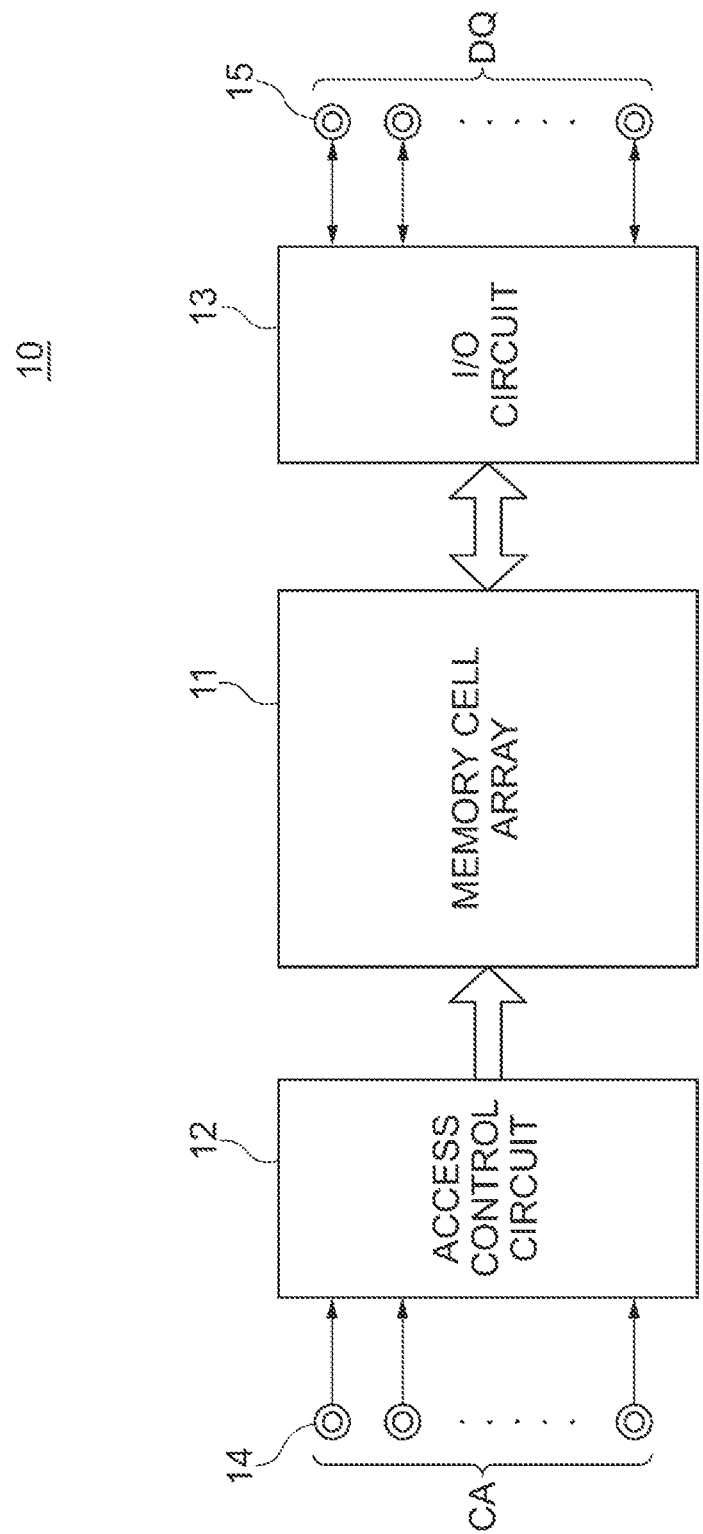
FIG. 1 is a block diagram showing a configuration of a semiconductor device according to the present disclosure.

FIG. 1 is a block diagram showing a configuration of a semiconductor device 10 according to the present disclosure. The semiconductor device 10 shown in FIG. 1 is, for example, a DRAM and includes a memory cell array 11, an access control circuit 12 that accesses the memory cell array 11, and an I/O circuit 13 that inputs and outputs data to/from the memory cell array 11. The access control circuit 12 accesses the memory cell array 11 based on a command address signal CA input from an external controller via a command address terminal 14. In a read operation, data DQ read out from the memory cell array 11 is output to a data I/O terminal 15 via the I/O circuit 13. In a write operation, data DQ input to the data I/O terminal 15 from the external controller is written to the memory cell array 11 via the I/O circuit 13.

Figure 2:
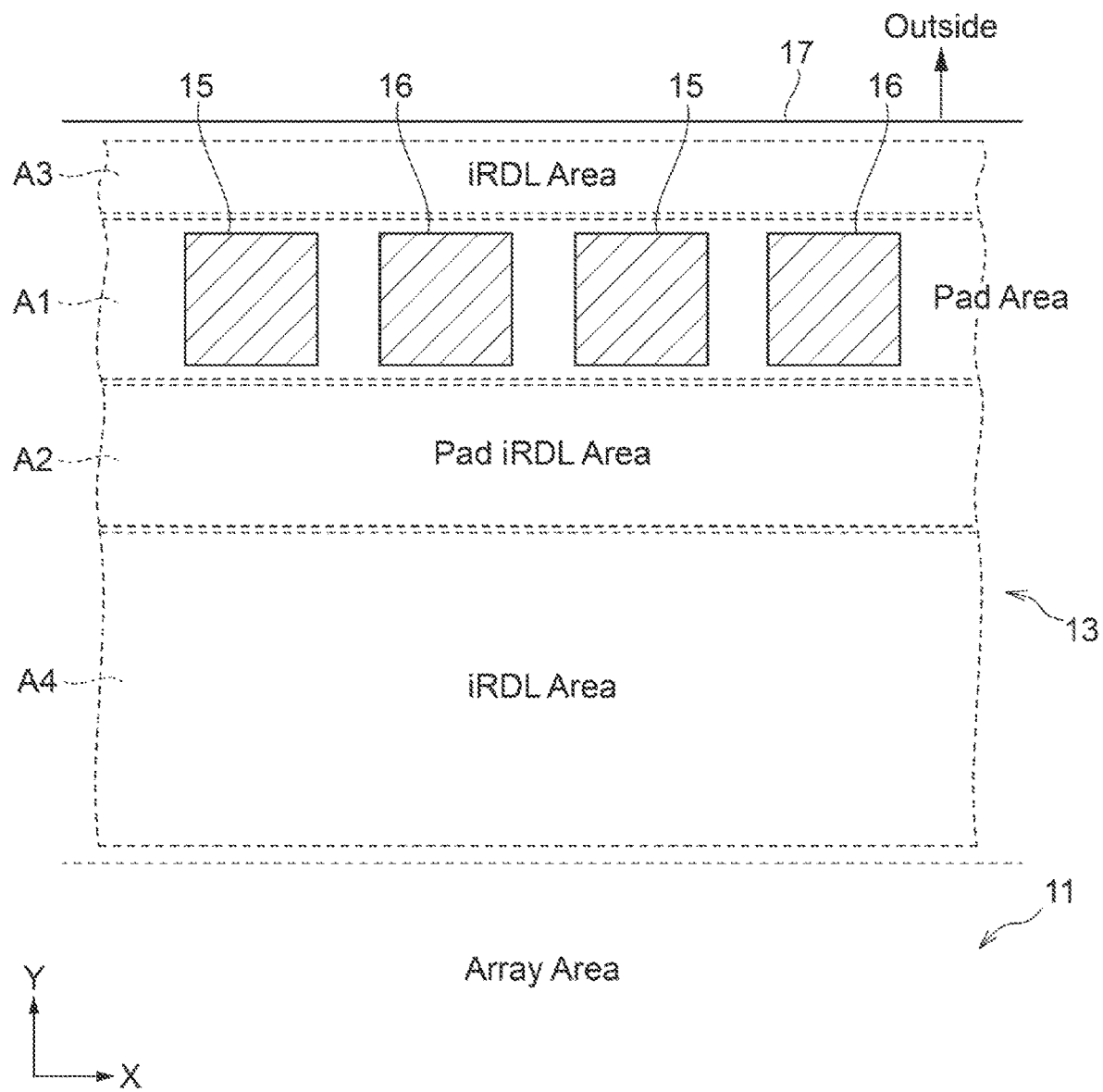
FIG. 2 is a schematic plan view for explaining a configuration of a conductor layer as an uppermost layer in an area in which an I/O circuit is arranged.

FIG. 2 is a schematic plan view for explaining a configuration of a conductor layer as an uppermost layer in an area in which the I/O circuit 13 is arranged. In the example shown in FIG. 2, the I/O circuit 13 is arranged near a chip edge 17 that is located at a chip end in the Y direction and extends in the X direction. In some examples, the Y direction may be perpendicular to the X direction. A plurality of pad electrodes including the data I/O terminal 15, a power supply terminal 16, and the like and an iRDL (inline redistribution layer) are arranged in the conductor layer as the uppermost layer in the area in which the I/O circuit 13 is arranged. More specifically, the conductor layer as the uppermost layer in the area in which the I/O circuit 13 is arranged includes a pad area A1 in which the pad electrodes are arranged, a pad iRDL area A2 in which the iRDL directly coupled to the pad electrodes is arranged, and iRDL areas A3 and A4 in which other iRDLs are arranged. These areas A1 to A4 extend in the X direction. As shown in FIG. 2, the iRDL area A3, the pad area A1, the pad iRDL area A2, and the iRDL area A4 are arranged in this order, when viewed from the chip edge 17. The pad area A1 and the pad iRDL area A2 have large layout constraints because the pad electrodes and the iRDL directly coupled to the pad electrodes are arranged in the areas A1 and A2 and therefore other iRDLs cannot be arranged freely. Meanwhile, in the iRDL areas A3 and A4, there are less layout constraints, and the iRDL can be arranged relatively freely. However, since the width in the Y direction of the iRDL area A3 near the chip edge 17 is narrow, the iRDL extending in the X direction is arranged in the iRDL area A3.

Figure 3:
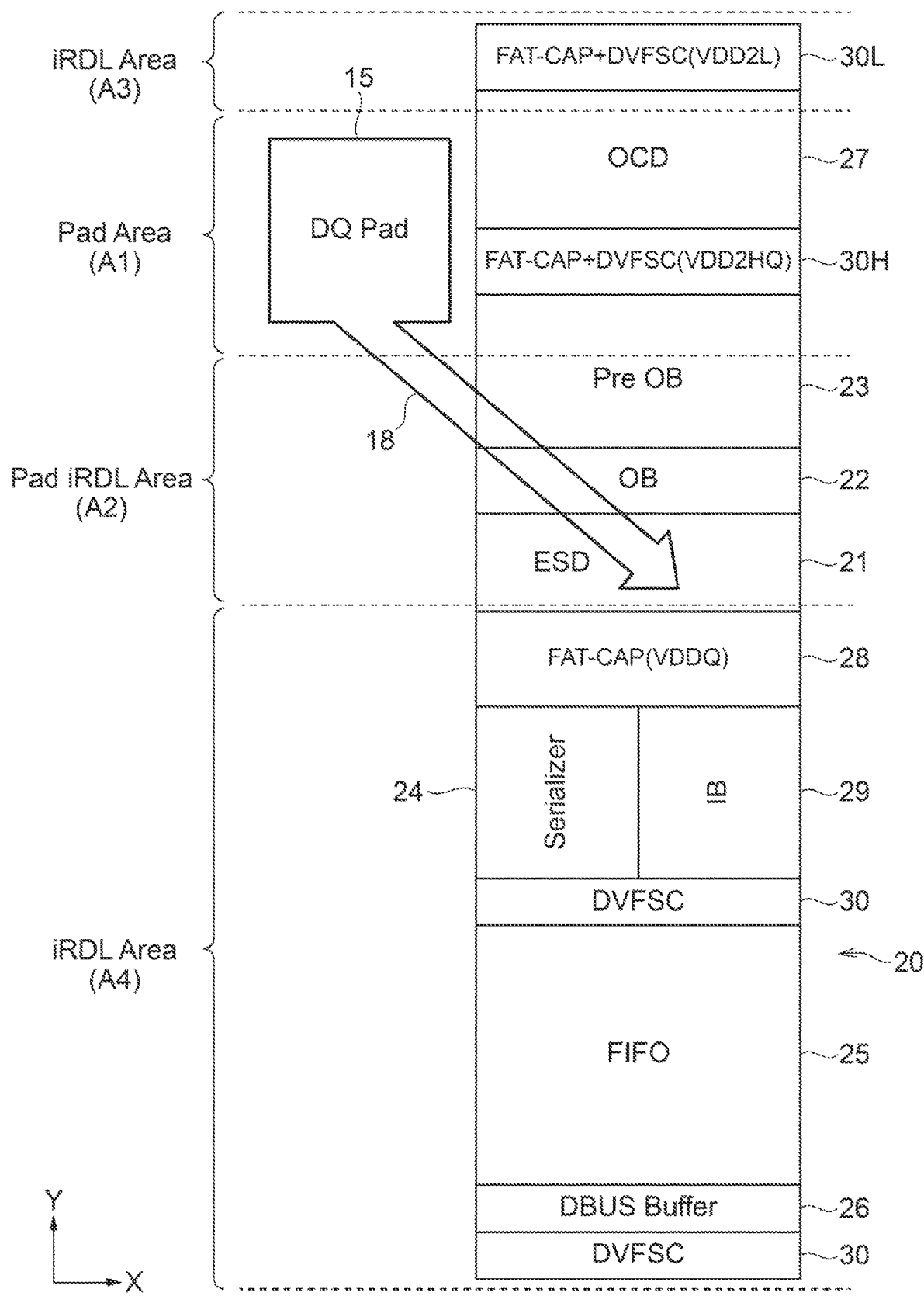
FIG. 3 is a schematic plan view showing a layout of a unit circuit associated with one data I/O terminal.

FIG. 3 is a schematic plan view showing a layout of a unit circuit 20 associated with one data I/O terminal 15. In the example shown in FIG. 3, the unit circuit 20 and the data I/O terminal 15 associated therewith do not overlap each other, and are coupled to each other via a wiring pattern 18 formed in the pad iRDL area A2 and extending diagonally. Although not shown, power supply wires coupled to the power supply terminals 16, for example, are also formed in the pad iRDL area A2. The power supply terminals 16 include a power supply terminal for a power voltage VDDQ, a power supply terminal for a power voltage VSS, a power supply terminal for a power voltage VDD2HQ, and a power supply terminal for a power voltage VDD2L.

As shown in FIG. 3, the unit circuit 20 includes an ESD protection circuit 21, an output buffer circuit 22, a pre-buffer circuit 23, a serializer 24, an FIFO circuit 25, a data bus buffer circuit 26, an off-chip driver circuit 27, a plurality of compensation capacitors 28, an input receiver circuit 29, and power-supply switching circuits 30, 30L, and 30H. Among these circuits, the ESD protection circuit 21, the output buffer circuit 22, and the input receiver circuit 29 are directly coupled to the data I/O terminal 15.

The ESD protection circuit 21 is coupled to the data I/O terminal 15 associated therewith via the wiring pattern 18. The output buffer circuit 22 outputs read data DQ to the data I/O terminal 15 in a read operation. The pre-buffer circuit 23 drives the output buffer circuit 22 based on the read data DQ. The serializer 24 converts the read data DQ in the form of parallel data to serial data and supplies the serial data to the pre-buffer circuit 23. The FIFO circuit 25 supplies the read data DQ supplied from the memory cell array 11 via a data bus, to the serializer 24 in a read operation. The input receiver circuit 29 receives write data DQ input via the data I/O terminal 15 in a write operation. The data bus buffer circuit 26 outputs the write data DQ after being converted to parallel data, to the data bus. The off-chip driver circuit 27 adjusts the resistance value of the output buffer circuit 22, thereby reducing the difference between the rising time and the falling time of the read data DQ. The plurality of compensation capacitors 28 suppresses power supply noise by stabilizing the power voltage VDDQ. The power-supply switching circuits 30, 30L, and 30H switch the level of a power voltage VPERICQ to be supplied to the pre-buffer circuit 23, the serializer 24, the input receiver circuit 29, the off-chip driver circuit 27, and the like.

Figure 4:
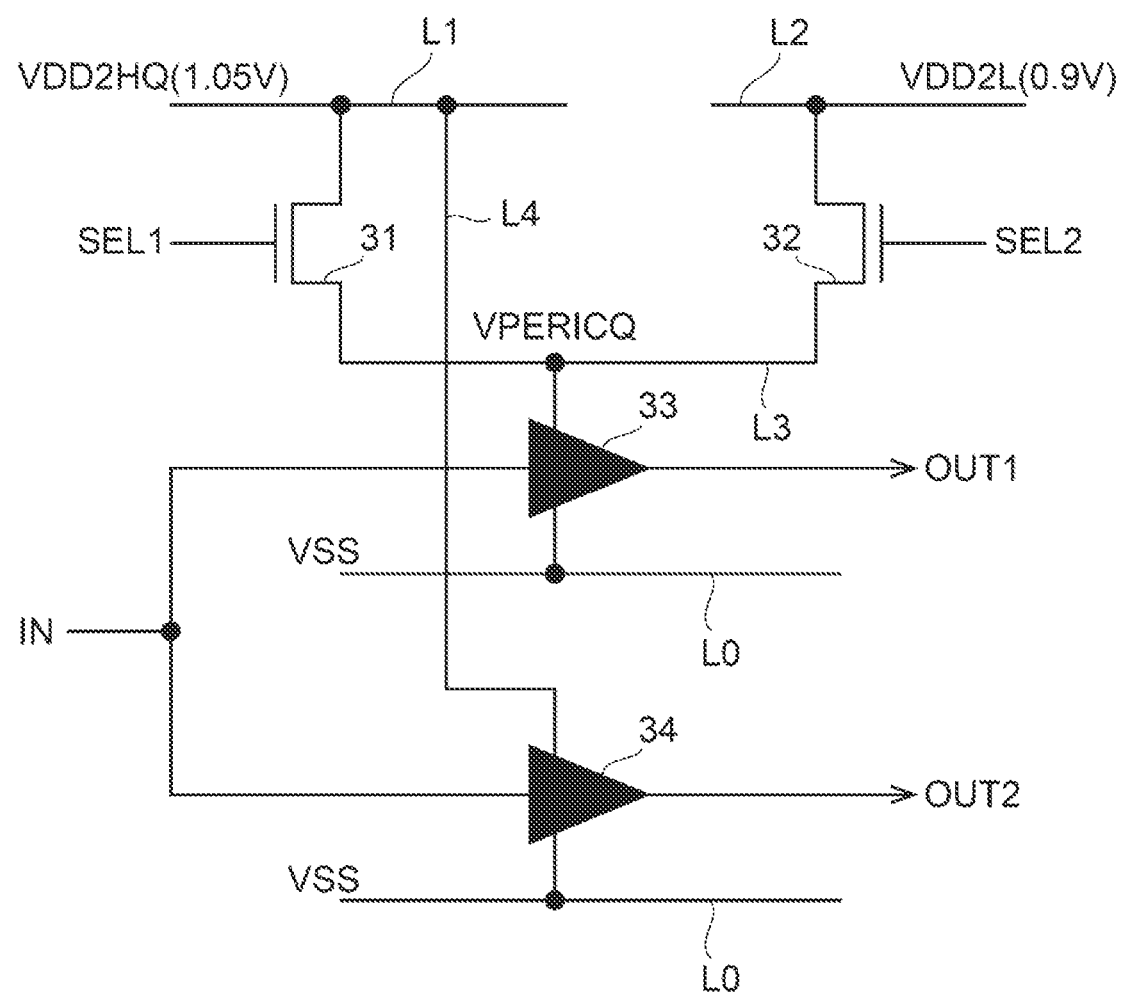
FIG. 4 is a circuit diagram of a power-supply switching circuit.

FIG. 4 is a circuit diagram of the power-supply switching circuit 30. As shown in FIG. 4, the power-supply switching circuit 30 includes a power switch 31 coupled between an external power supply line L1 and an internal power supply line L3 and a power switch 32 coupled between an external power supply line L2 and the internal power supply line L3. The power switches 31 and 32 are each configured by an N-channel MOS transistor. Although the power switches 31 and 32 are each represented by a single transistor in FIG. 4, they may have a configuration in which plural transistors are coupled in parallel. A selection signal SEL1 is supplied to a gate electrode of the transistor configuring the power switch 31. A selection signal SEL2 is supplied to a gate electrode of the transistor configuring the power switch 32. The selection signals SEL1 and SEL2 are made active exclusively. The power voltage VDD2HQ is supplied to the external power supply line L1 from outside via a power supply pad. The power voltage VDD2L is supplied to the external power supply line L2 from outside via another power supply pad. The power voltage VDD2HQ is higher than the power voltage VDD2L. For example, the power voltage VDD2HQ is 1.05 V, and the power voltage VDD2L is 0.9 V. The internal power supply line L3 is an internal power supply line for supplying the power voltage VPERICQ to a driver circuit 33.

The driver circuit 33 is included in each of the pre-buffer circuit 23, the serializer 24, the input receiver circuit 29, the off-chip driver circuit 27, and the like and operates with a voltage between the power voltage VPERICQ supplied to the internal power supply line L3 and the power voltage VSS supplied to an internal power supply line L0. Accordingly, the driver circuit 33 included in each of the pre-buffer circuit 23, the serializer 24, the input receiver circuit 29, the off-chip driver circuit 27, and the like operates with the power voltage VDD2HQ (=1.05 V) when the selection signal SEL1 is active, and operates with the power voltage VDD2L (=0.9 V) when the selection signal SEL2 is made active. Consequently, the driver circuit 33 can be caused to operate at higher speed when the selection signal SEL1 is made active, and current consumption of the driver circuit 33 can be reduced when the selection signal SEL2 is made active.

Both the power switch 31 controlled by the selection signal SEL1 and the power switch 32 controlled by the selection signal SEL2 are arranged in the power-supply switching circuit 30 shown in FIG. 3. Meanwhile, in the power-supply switching circuit 30H shown in FIG. 3, only the power switch 31 is arranged, and the power switch 32 is not arranged. In the power-supply switching circuit 30L, only the power switch 32 is arranged, and the power switch 31 is not arranged. In a circuit block in which the power-supply switching circuit 30H is arranged, a plurality of compensation capacitors is also arranged which stabilizes the power voltage VDD2HQ. In some examples, each of the plurality of compensation capacitors may be coupled to an external power supply line L4. In a circuit block in which the power-supply switching circuit 30L is arranged, a plurality of compensation capacitors is also arranged which stabilizes the power voltage VDD2L. In some examples, each of the plurality of compensation capacitors may be coupled to an external power supply line L2.

Further, another driver circuit 34 coupled in parallel to the driver circuit 33 is included in each of the pre-buffer circuit 23, the serializer 24, the input receiver circuit 29, the off-chip driver circuit 27, and the like. A common input signal IN is supplied to the driver circuits 33 and 34, and either one of output signals OUT1 and OUT2 respectively output from the driver circuits 33 and 34 is enabled. The driver circuit 34 operates with a voltage between the power voltage VDD2HQ supplied to an external power supply line L4 and the power voltage VSS supplied to the internal power supply line L0. The external power supply line L4 is directly coupled to the external power supply line L1 not via a power switch. Therefore, a higher-speed operation can be realized when the driver circuit 34 is used in place of the driver circuit 33 than when the selection signal SEL1 is made active.

Figure 5:
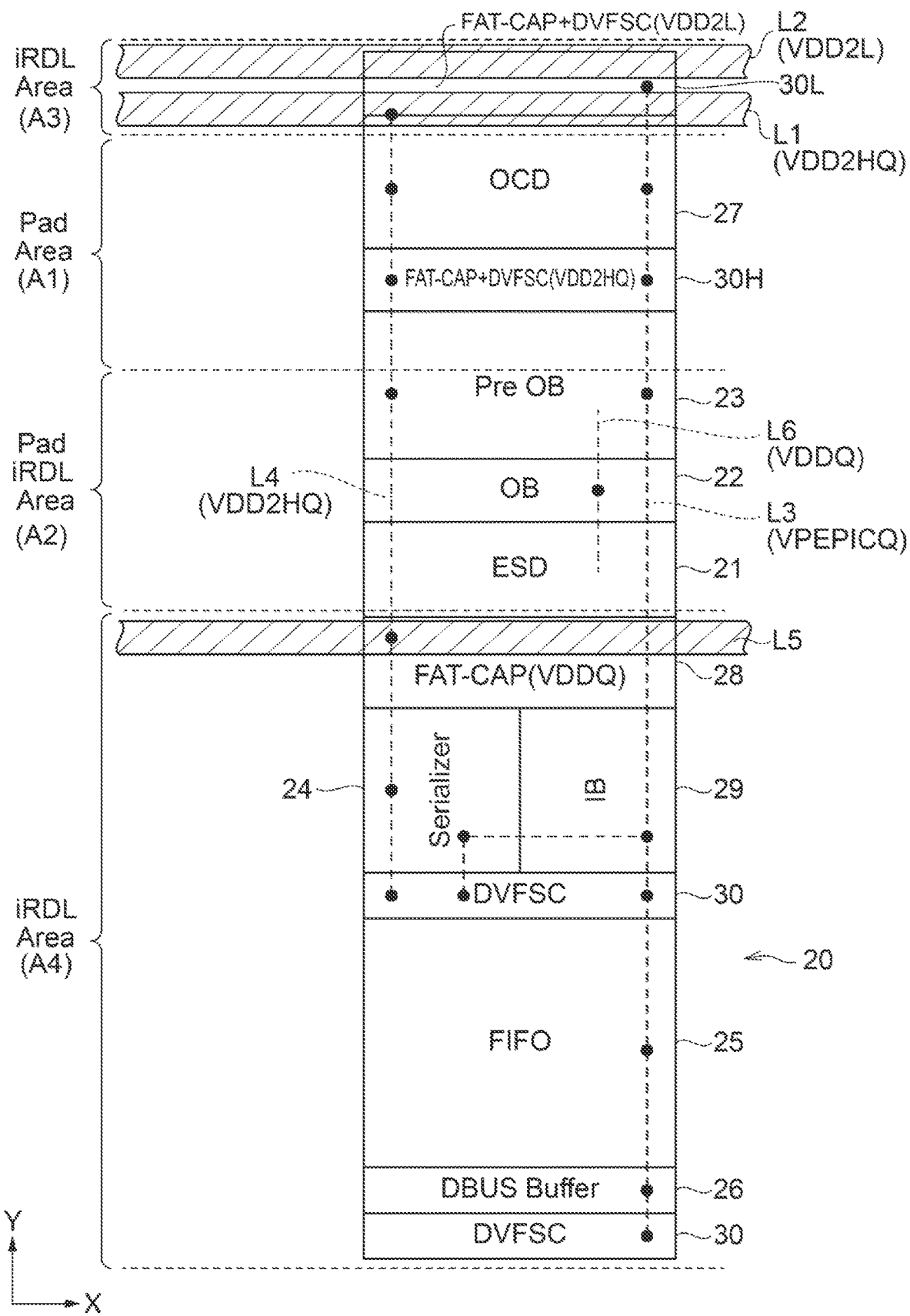
FIG. 5 is a schematic diagram for explaining a layout of external power supply lines and an internal power supply line.

FIG. 5 is a schematic diagram for explaining a layout of the external power supply lines L1, L2, and L4 and the internal power supply line L3. As shown in FIG. 5, the external power supply lines L1 and L2 extend in the X direction along each other in the iRDL area A3. The external power supply lines L1 and L2 overlap the power-supply switching circuit 30L. Therefore, the power voltage VDD2L supplied via the external power supply line L2 is coupled to the power switch 32 included in a circuit block directly below the external power supply line L2. The external power supply line L2 and the power switch 32 are thus coupled to each other with extremely low resistance. The internal power supply line L3 coupled to a source of the power switch 32 is formed in a wiring layer below an iRDL and extends in the Y direction, thereby supplying the power voltage VPERICQ to the pre-buffer circuit 23, the serializer 24, the input receiver circuit 29, the off-chip driver circuit 27, and the like. The dedicated power voltage VDDQ is supplied to the output buffer circuit 22 via a power supply line L6.

The power-supply switching circuit 30H is arranged at a position not overlapping the external power supply lines L1 and L2. The power switch 31 included in the power-supply switching circuit 30H is coupled to the external power supply line L1 via the external power supply line L4 located in the same wiring layer as the internal power supply line L3. The external power supply line L4 also extends in the Y direction, whereby the power voltage VDD2HQ is supplied to the power switch 31. A source of the power switch 31 is coupled to the internal power supply line L3 as with the source of the power switch 32. Further, the external power supply line L4 is arranged in the iRDL area A4 and is also coupled to another external power supply line L5 to which the power voltage VDD2HQ is supplied. Due to the iRDL in the form of mesh, resistance between a power supply pad to which the power voltage VDD2HQ is supplied and the power-supply switching circuit 30H is made low.

Figure 6:
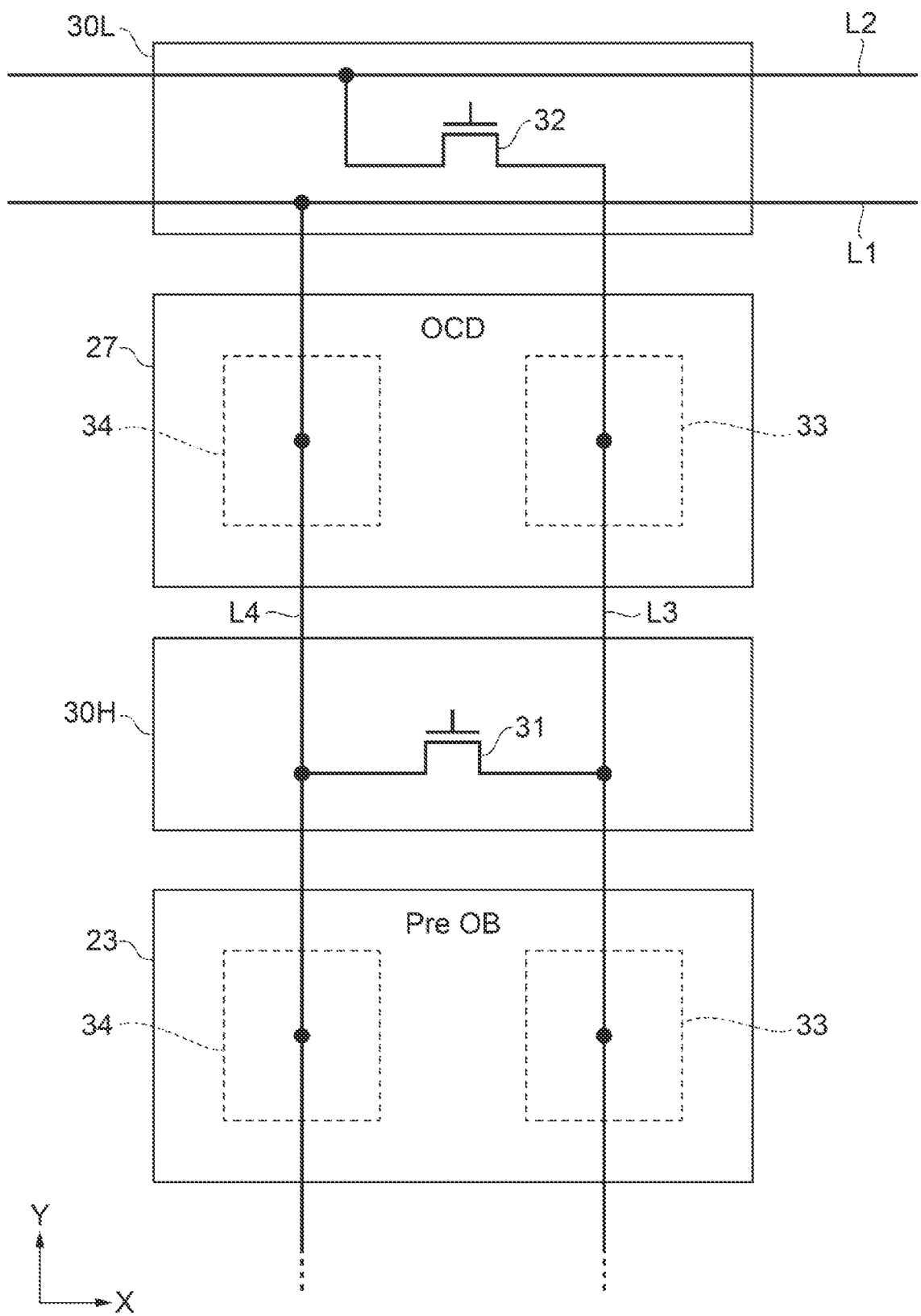
FIG. 6 is a schematic diagram for explaining a coupling relation between the external power supply lines, the internal power supply line, an off-chip driver circuit, and a pre-buffer circuit.

FIG. 6 is a schematic diagram for explaining a coupling relation between the external power supply lines L1, L2, and L4, the internal power supply line L3, the off-chip driver circuit 27, and the pre-buffer circuit 23. Among circuits included in the unit circuit 20, the off-chip driver circuit 27 and the pre-buffer circuit 23 are especially required to supply the power voltage VDD2HQ with low resistance. In particular, the pre-buffer circuit 23 puts the highest priority on supplying the power voltage VDD2HQ with low resistance.

Figure 7:
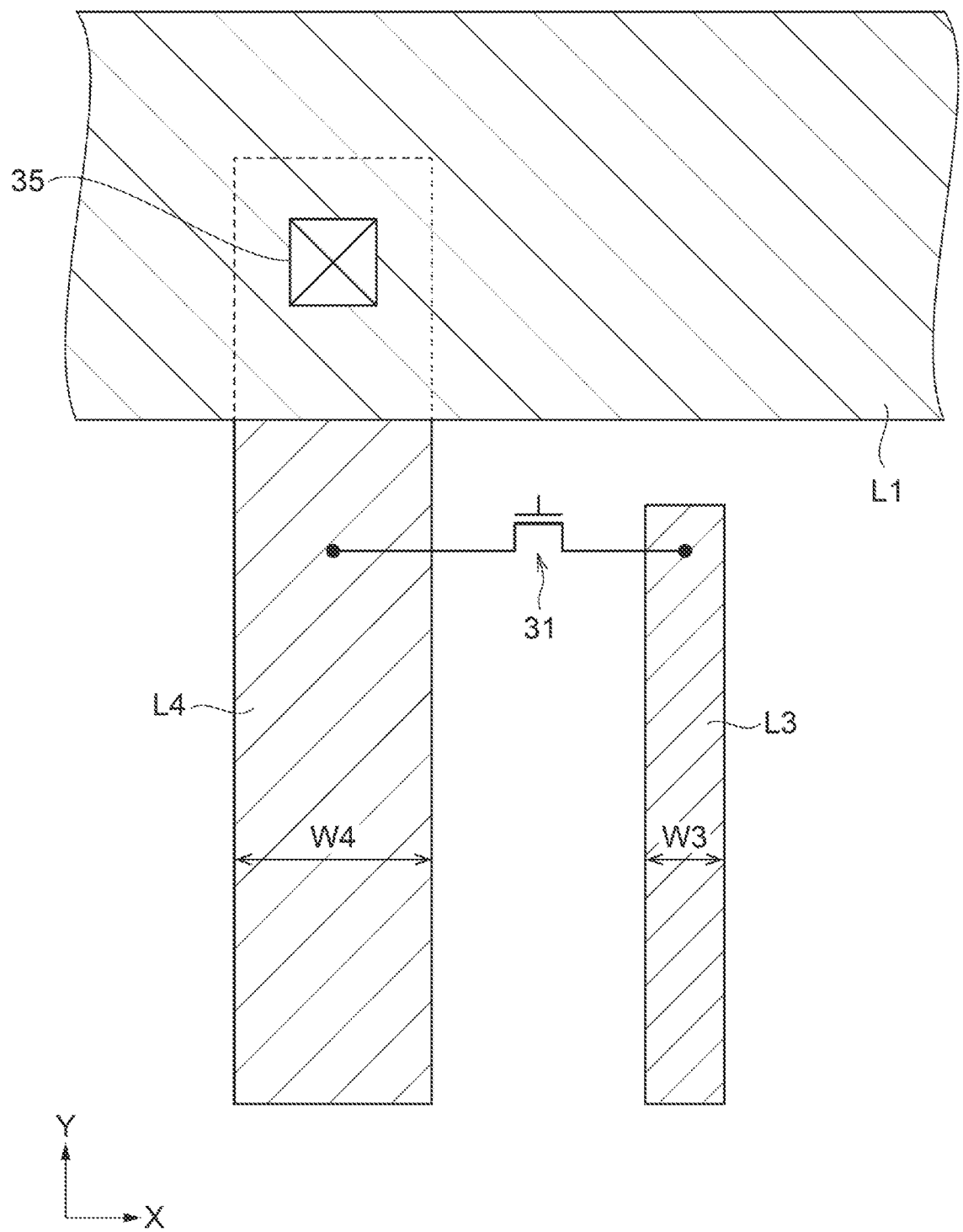
FIG. 7 is a schematic diagram for explaining a relation of pattern widths between an internal power supply line L3 and an external power supply line L4.

As shown in FIG. 6, the power-supply switching circuit 30H provided with the power switch 31 is arranged to be sandwiched between the off-chip driver circuit 27 and the pre-buffer circuit 23 in the Y direction. This configuration minimizes the distances in the Y direction between the power-supply switching circuit 30H and the off-chip driver circuit 27 and between the power-supply switching circuit 30H and the pre-buffer circuit 23. Meanwhile, the power-supply switching circuit 30L provided with the power switch 32 is arranged outside the off-chip driver circuit 27, that is, at a position overlapping the external power supply lines L1 and L2. Therefore, the distance in the Y direction between the power-supply switching circuit 30L and the pre-buffer circuit 23 becomes longer than the distance in the Y direction between the power-supply switching circuit 30H and the pre-buffer circuit 23. Here, each of the off-chip driver circuit 27 and the pre-buffer circuit 23 includes the driver circuit 33 that operates with the power voltage VPERICQ supplied via the internal power supply line L3 and the driver circuit 34 that operates with the power voltage VDD2HQ supplied via the external power supply line L4. Since the power-supply switching circuit 30H provided with the power switch 31 is sandwiched between the off-chip driver circuit 27 and the pre-buffer circuit 23 in the Y direction as described above, when the driver circuit 33 is used, the wiring distance between the power switch 31 and the driver circuit 33 is shortened. While the power voltage VDD2HQ is supplied to the power switch 31 via the external power supply line L4, a line width W4 of the external power supply line L4 is wider than a line width W3 in the X direction of the internal power supply line L3 as shown in FIG. 7 and is lower in resistance than the internal power supply line L3. This is because, when the driver circuit 34 is used, the fastest operation is required and it is therefore necessary to supply the power voltage VDD2HQ to the driver circuit 34 with low resistance. Since the power voltage VDD2HQ is supplied to the power switch 31 via the external power supply line L4 with low resistance in this manner, the power voltage VDD2HQ can be supplied to the off-chip driver circuit 27 and the pre-buffer circuit 23 with low resistance even when the power switch 31 is used.

Reference numeral 35 in FIG. 7 denotes a via conductor that couples the external power supply line L1 and the external power supply line L4 to each other. Since the external power supply line L1 is formed by an iRDL, its line width is sufficiently larger than the line width W4 of the external power supply line L4, and its pattern thickness is also sufficiently larger than the pattern thickness of the external power supply line L4.

As described above, in the present embodiment, the power-supply switching circuit 30L, the off-chip driver circuit 27, the power-supply switching circuit 30H, and the pre-buffer circuit 23 are arranged in this order in the Y direction, and the power voltage VDD2HQ is supplied to the power-supply switching circuit 30H via the external power supply line L4 having a large line width directly coupled to the external power supply line L1. Due to this configuration, when the power voltage VDD2HQ is supplied via the internal power supply line L3, the power voltage VDD2HQ can be supplied with low resistance, especially to the off-chip driver circuit 27 and the pre-buffer circuit 23.

Figure 8:
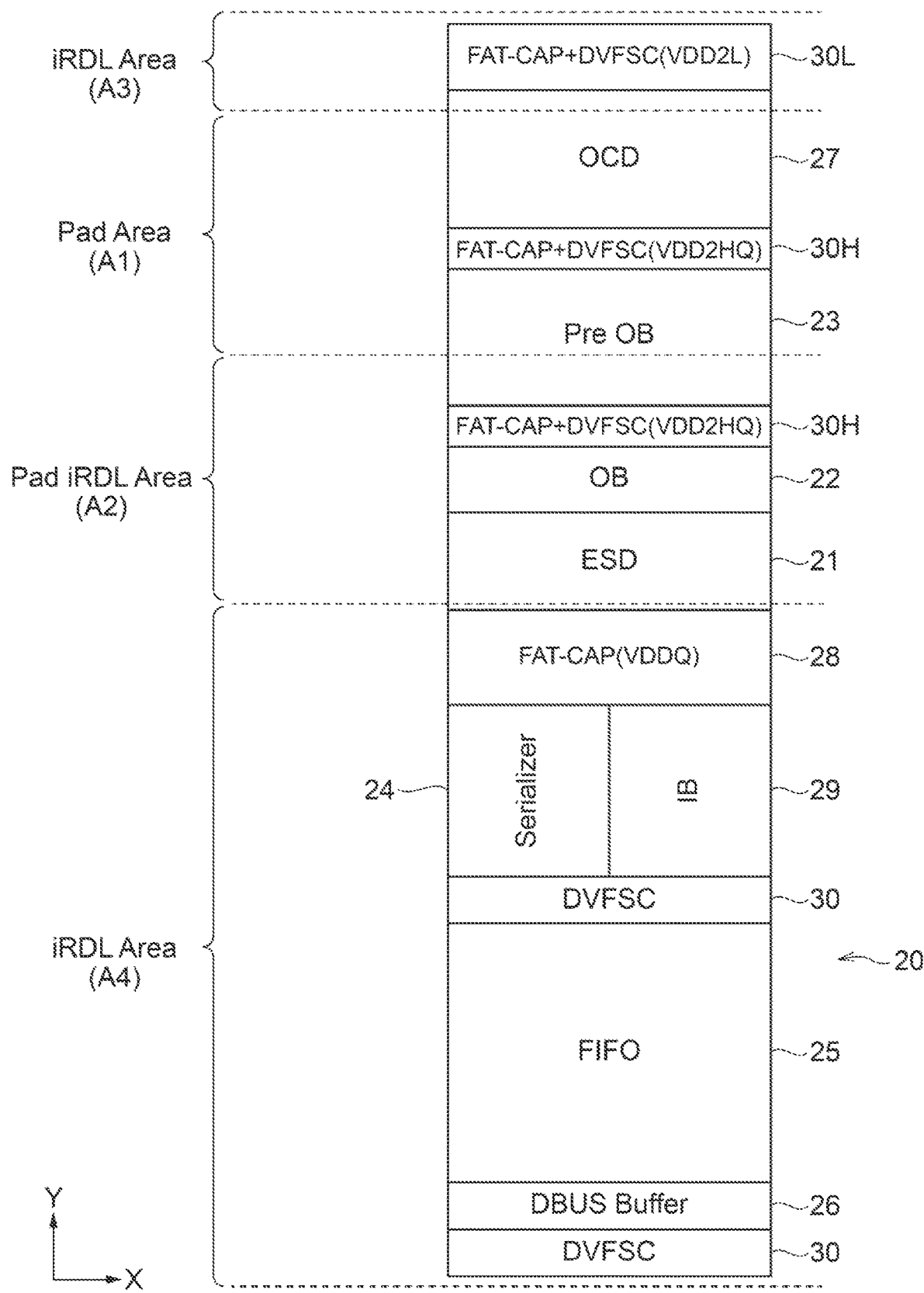
FIG. 8 is a schematic plan view showing a layout of a unit circuit according to a first modification.

FIG. 8 is a schematic plan view showing a layout of a unit circuit 20A according to a first modification. The unit circuit 20A shown in FIG. 8 is different from the unit circuit 20 described above in that two power-supply switching circuits 30H are provided to sandwich the pre-buffer circuit 23 therebetween in the Y direction. As exemplified by the unit circuit 20A according to the first modification, the power-supply switching circuits 30H may be arranged to be distributed in a plurality of circuit blocks.

Figure 9:
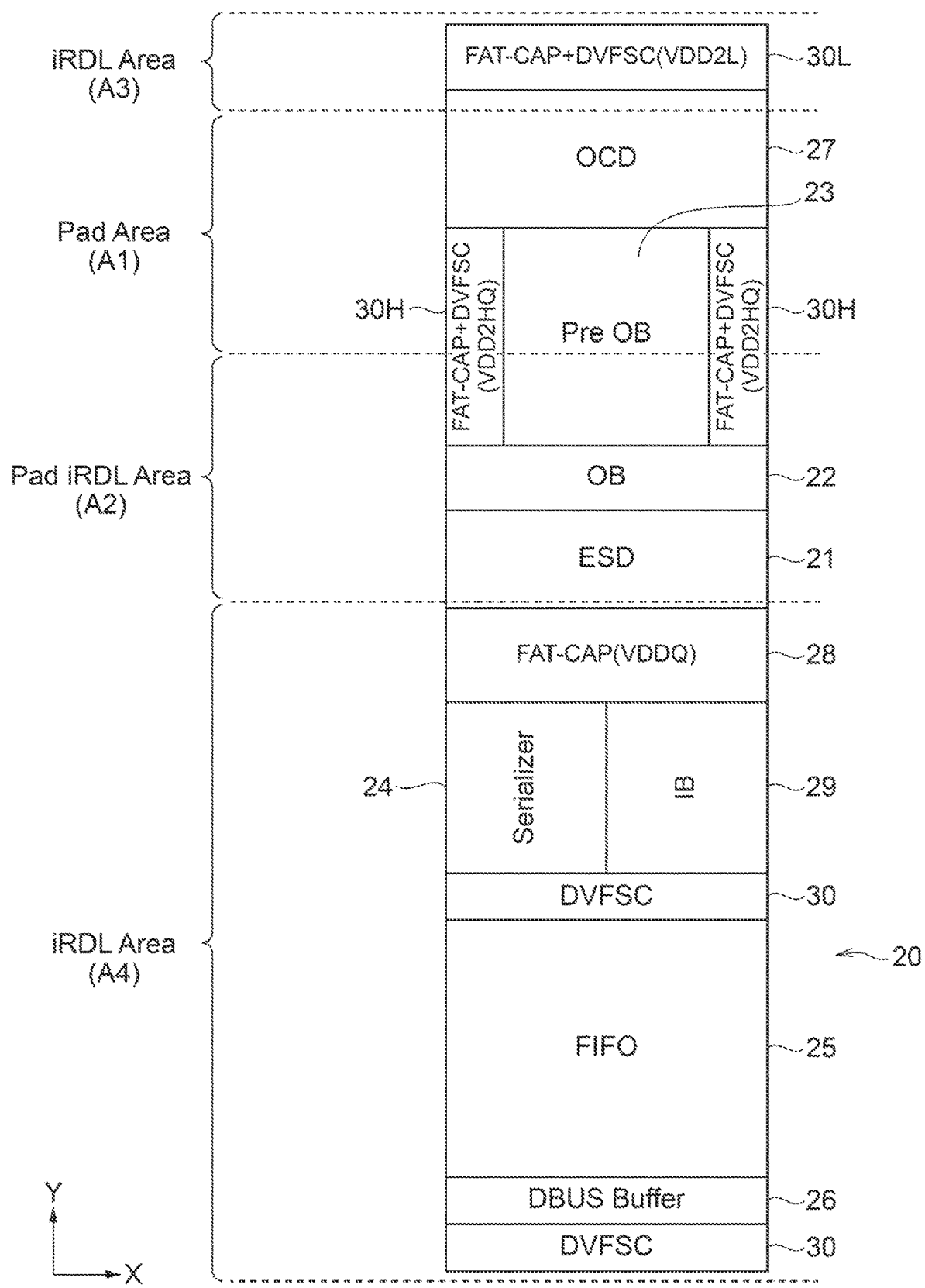
FIG. 9 is a schematic plan view showing a layout of a unit circuit according to a second modification.

FIG. 9 is a schematic plan view showing a layout of a unit circuit 20B according to a second modification. The unit circuit 20B shown in FIG. 9 is different from the unit circuit 20 described above in that two power-supply switching circuits 30H are provided to sandwich the pre-buffer circuit 23 therebetween in the X direction. As exemplified by the unit circuit 20B according to the second modification, the pre-buffer circuit 23 may be sandwiched by the two power-supply switching circuits 30H in the X direction.

Figure 10A:
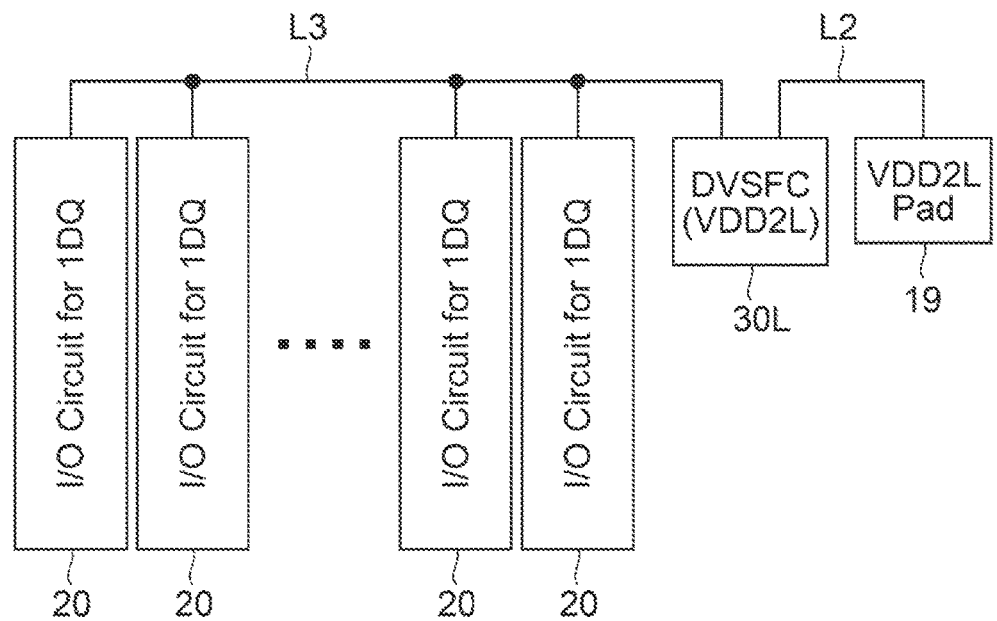
FIGS. 10A and 10B are schematic diagrams for explaining an example of arranging the power-supply switching circuit outside the unit circuit.
Figure 10B:
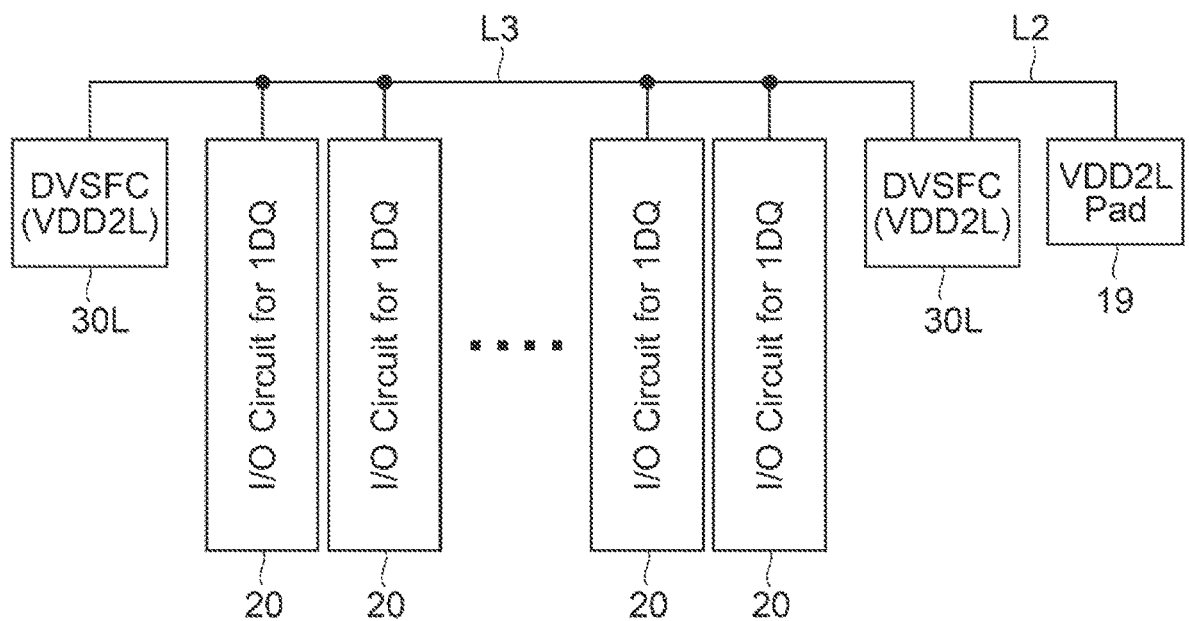

Further, as shown in FIG. 10A, the power-supply switching circuit 30L may be arranged outside the unit circuits 20, and one power-supply switching circuit 30L may be assigned to the plural unit circuits 20. Alternatively, as shown in FIG. 10B, two power-supply switching circuits 30L that are coupled in common to the plural unit circuits 20 may be assigned to the unit circuits 20. Also in these cases, it is preferable that a power supply pad 19 to which the power voltage VDD2L is supplied and the power-supply switching circuit(s) 30L use the external power supply line L2 that uses an iRDL and has low resistance.

Although various embodiments have been disclosed in the context of certain preferred embodiments and examples, it will be understood by those skilled in the art that the scope of the present disclosure extends beyond the specifically disclosed embodiments to other alternative embodiments and/or uses of the embodiments and obvious modifications and equivalents thereof. In addition, other modifications which are within the scope of this disclosure will be readily apparent to those of skill in the art based on this disclosure. It is also contemplated that various combination or sub-combination of the specific features and aspects of the embodiments may be made and still fall within the scope of the disclosure. It should be understood that various features and aspects of the disclosed embodiments can be combined with or substituted for one another in order to form varying modes of the disclosed embodiments. Thus, it is intended that the scope of at least some of the present disclosure should not be limited by the particular disclosed embodiments described above.

The invention claimed is:

1. An apparatus comprising:
   first, second, third and fourth circuit regions arranged in a first direction in numerical order;
   wherein the first circuit region includes a first global power supply line extending in a second direction perpendicular to the first direction and a first local power supply line, the first local power supply line being branched from the first global power supply line and extending in the first direction across the second, third and fourth circuit regions;
   wherein the third circuit region includes a first power switch coupled between the first local power supply line and an internal power supply line extending in the first direction across the first, second, third and fourth circuit regions; and
  wherein each of the second and fourth circuit regions includes a circuit coupled to the first local power supply line and an additional circuit coupled to the internal power supply line.

2. The apparatus of claim 1, wherein the first circuit region further includes a second global power supply line extending in the second direction and a second power switch coupled between the second global power supply line and the internal power supply line.

3. The apparatus of claim 2, wherein the first global power supply line is supplied with a greater voltage than the second global power supply line.

4. The apparatus of claim 1, further comprising a fifth circuit region next to the fourth circuit region;
  wherein the fifth circuit region includes another circuit operatively receiving at least one of output signals from the circuit in the second circuit region and the additional circuit in the fourth region.

5. The apparatus of claim 4, wherein the output signals are derived from read data from memory cells and the another circuit is configured to drive a data pad based on the output signals.

6. The apparatus of claim 2, wherein each of the first and second global power supply lines is arranged in an uppermost wiring layer.

7. The apparatus of claim 1, wherein the third circuit region further includes a plurality of compensation capacitors each coupled to the first local power supply line.

8. The apparatus of claim 2, wherein the first circuit region further includes a plurality of additional compensation capacitors each coupled to the second global power line.

9. An apparatus comprising:
  a first external power supply line supplied with a first external power voltage;
  a second external power supply line supplied with a second external power voltage different from the first external power voltage;
  a first circuit block including a first circuit configured to operate with an internal power voltage supplied from an internal power supply line;
  a second circuit block including a second circuit configured to operate with the internal power voltage supplied from the internal power supply line;
  a third circuit block including a first power switch coupled between the first external power supply line and the internal power supply line; and
  a fourth circuit block including a second power switch coupled between the second external power supply line and the internal power supply line,
  wherein the first, third, second, and fourth circuit blocks are arranged in a first direction in this order.

10. The apparatus of claim 9, wherein the first external power voltage is higher than the second external power voltage.

11. The apparatus of claim 10, wherein the first and second external power supply lines extend in parallel in a second direction perpendicular to the first direction.

12. The apparatus of claim 11, wherein each of the first and second external power supply lines overlaps the fourth circuit block without overlapping the third circuit block.

13. The apparatus of claim 12, wherein the first and second external power supply lines are arranged on an iRDL (inline redistribution layer).

14. The apparatus of claim 13, wherein the first and second circuit blocks further include third and fourth circuits, respectively, configured to operate with the first external power voltage.

15. The apparatus of claim 14, further comprising a third external power supply line coupled between the first external power supply line and the third and fourth circuits so as to supply the first external power voltage to the third and fourth circuits.

16. The apparatus of claim 15, wherein the third external power supply line is arranged on a wiring layer lower than the iRDL.

17. The apparatus of claim 16, wherein the third external power supply line extends in the first direction.

18. The apparatus of claim 17, wherein the internal power supply line is arranged on the wiring layer and extends in the first direction.

19. The apparatus of claim 18, wherein the third external power supply line is greater in width than the internal power supply line.

20. The apparatus of claim 9, further comprising an output buffer circuit configured to output read data to outside,
  wherein each of the first and third circuits included in the first circuit block is a pre-buffer circuit that drives the output buffer circuit based on the read data.

21. The apparatus of claim 20, wherein each of the second and fourth circuits included in the second circuit block is an off-chip driver circuit configured to adjust a resistance value of the output buffer circuit.

22. An apparatus comprising:
  a first power supply line arranged on au iRDL (inline redistribution layer) and extending in a first direction;
  a second power supply line arranged on a wiring layer lower than the IRDL, extending in a second direction perpendicular to the first direction, and short-circuited to the first power supply line;
  a third power supply line arranged on the wiring layer and extending in the second direction;
  a first circuit block including a first circuit configured to operate with a first power voltage supplied from the second power supply line and a second circuit configured to operate with a second power voltage supplied from the third power supply line;
  a second circuit block including a third circuit configured to operate with the first power voltage supplied from the second power supply line and a fourth circuit configured to operate with the second power voltage supplied from the third power supply line; and
  a third circuit block including a first power switch coupled between the second and third power supply lines,
  wherein the third circuit block is arranged between the first and second circuit blocks in the second direction, and
  wherein the second power supply line is greater in width than the third power supply line.

23. The apparatus of claim 22, further comprising:
  a fourth power supply line arranged on the iRDL and extending in the first direction; and
  a fourth circuit block including a second power switch coupled between the third and fourth power supply lines,
  wherein the second circuit block is arranged between the third and fourth circuit blocks in the second direction,
  wherein the fourth power supply line overlaps the fourth circuit block, and wherein the first power supply line does not overlap the third circuit block.

* * * * *